United States Patent [19]

Shindou et al.

[11] Patent Number: 4,705,726

[45] Date of Patent: Nov. 10, 1987

[54] ANTICORROSIVE WELDABLE COATED STEEL

[75] Inventors: Yoshio Shindou; Joji Oka; Taketoshi Taira; Yujiro Miyauchi; Fumio Yamazaki, all of Kimitsu, Japan

[73] Assignee: Nippon Steel Corporation, Tokyo, Japan

[21] Appl. No.: 10,074

[22] Filed: Feb. 2, 1987

[30] Foreign Application Priority Data

Mar. 12, 1986 [JP] Japan ................... 61-52397

[51] Int. Cl.⁴ .............................................. B22F 7/04
[52] U.S. Cl. .................................... 428/562; 428/553; 428/659; 106/14.05; 427/406; 252/387
[58] Field of Search ............... 428/553, 562, 658, 659; 106/14.05; 427/406; 252/387

[56] References Cited

U.S. PATENT DOCUMENTS

| 4,407,899 | 10/1983 | Hara et al. | 428/659 |
| 4,407,900 | 10/1983 | Kirihara et al. | 428/659 |
| 4,450,209 | 5/1984 | Hara et al. | 428/659 |
| 4,524,111 | 6/1985 | Oka et al. | 428/659 |
| 4,543,300 | 9/1985 | Hara et al. | 428/659 |
| 4,588,658 | 5/1986 | Patil et al. | 428/659 |
| 4,610,937 | 9/1986 | Ito et al. | 428/659 |

Primary Examiner—Stephen J. Lechert, Jr.
Attorney, Agent, or Firm—Pollock, Vande Sande & Priddy

[57] ABSTRACT

A weldable steel plate plated with zinc, a zinc base alloy or zinc composite and coated on the plating with a coating material comprising a mixture of at least one type of ferrous alloy powder with an oxygen concentration of 1.0% by weight or less and zinc dust, is provided, and the weldable coated steel plate also has good workability, coherence, weldability and corrosion resistance.

8 Claims, 2 Drawing Figures

ANTICORROSIVE WELDABLE COATED STEEL

BACKGROUND OF THE INVENTION

FIELD OF THE INVENTION

This invention relates to anticorrosive steel, more particularly to weldable coated steel with excellent corrosion resistance.

DESCRIPTION OF THE PRIOR ART

Various types of anticorrosive steel have been proposed for use under highly corrosive environments. For instance, metal plated steel such as galvanized steel or zinc alloy plated steel and weldable coated steel made by coating steel with a zinc-rich coating material called "Zincrometal" (Japanese Patent Publication No. 904/77) have been used as anticorrosive surface treated steel for automobiles. In the case of coated steel using said zinc-rich coating material, the workability, coherence and anti-corrosiveness of the coat are greatly affected by the content of zinc dust in the coating material. A high content of zinc dust is preferred for weldability, but it leads to a reduction of workability and coherence of the coat. It is known that when the content of zinc dust exceeds about 80% by weight, there occurs a phenomenon called powdering, or falling-off of the coat in powdery form, to an excess degree during press molding. On the other hand, as is well known, no desired sacrificial anticorrosive effect is obtained unless the zinc dust content exceeds 90% by weight, but such high content of zinc dust (exceeding 90% by weight) adversely affects the press moldability of coated steel.

It is thus difficult to obtain a weldable steel plate coated with a coating material containing zinc dust, which can satisfy all the requirements for workability, coherence, weldability and corrosion resistance. In an attempt to break through this problem, the present inventors previously proposed coated steel plates made by coating galvanized steel with a coating material with a low content of zinc dust (see Japanese Patent Kokoku (Post-Exam. Publication) No. 11331/79), zinc alloy-plated steel having no amount of blister on the coat, and composite-galvanized steel coated with a coating material with a low content of zinc dust (see Japanese Patent Kokai (Laid-Open) No. 189842/82 or 157995/83).

Request has risen in recent years for the longer life of car body by further improvement of corrosion resistance. However, the hitherto proposed types of surface treated steel as mentioned above were still unsatisfactory for meeting the expressed requirement for long-time corrosion resistance, such as 10-year proofing against fretting by rust, especially when such steel was used in the parts exposed to a very severe corrosive environment, for example, the inside of the car door where water and salt tends to stay pent up.

Also, when zinc dust is used as conductive powder in a coating material like Zincrometal, the formed coat is highly soft as a whole due to low hardness of zinc dust and the coated surface of steel would become too much lurbicant at the time of pressing work, causing an increased flow rate of steel into the press mold in the pressing work to make it unable to perform drawing work like cold-rolled steel, so that it becomes necessary for conducting the desired work to sharpen the beads of the mold (for example, changing the round type to square type) or to increase the blank holding force. However, the sharpened beads invite a greater chance of the coat being chipped off by the mold, and the build-up of chips would give rise to such problems as scratching and soiling of the product.

On the other hand, the coat of "weldable coated" steel contains a hard conductive powder, such as TiC, WC or stainless steel powder, mixed with soft zinc dust to afford good weldability and electrodeposition coatability to the steel, but because of the presence of hard powder in the coat, such weldable coated steel is lower in flow rate to the mold in the pressing process in comparison with normal steel and is more vulnerable to cracking in the press work. Also, if the press work of such steel is performed with a metal mold which has had no hard plating or no hardening treatment on the surface, wear of the mold is pre- cipitated.

SUMMARY OF THE INVENTION

As a result of the present inventors studies for eliminating said defects of the conventional weldable coated steel, the present inventors have found that the corrosion resistance of steel could be improved by adjusting the oxygen concentration in ferrous alloy or ferroalloy powder contained in the coating material to 1.0% by weight or less. The present invention has been attained on the basis of such finding, and it provides weldable coated steel characterized in that base steel is first subjected to plating with zinc or a zinc base alloy or composite plating and then further coated with a coating material prepared by mixing at least one kind of ferrous alloy or ferroalloy powder having an oxygen concentration of 1.0% by weight or less with zinc dust.

DETAILED DESCRIPTION OF PREFERRED EMBODIMENTS

Figure 1:
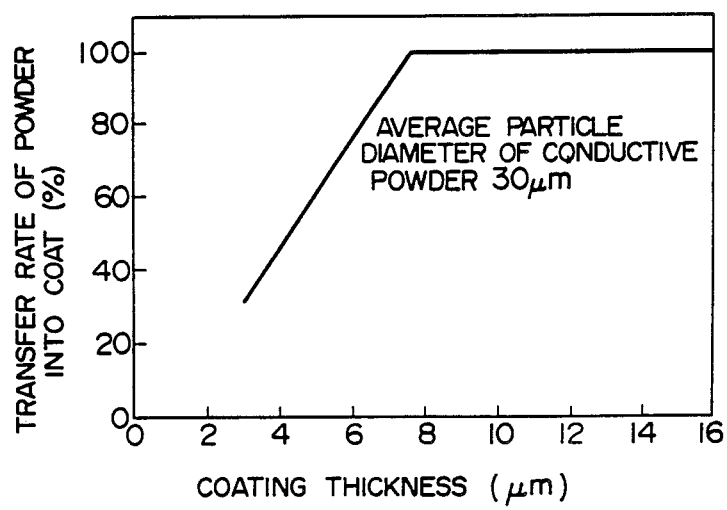
FIG. 1 is a graph illustrating the relationship between the coating thickness and the transfer rate of powder into the coat where the conductive powder particles are coarse.
Figure 2:
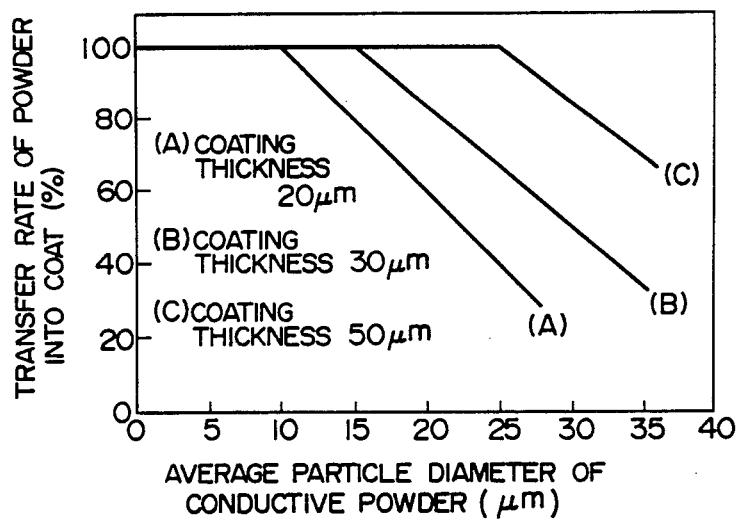
FIG. 2 is a graph illustrating the relationship between the powder particle diameter and coating thickness and the transfer rate of powder into the coat in an embodiment of this invention.

The typical factors having an influence on the performance of weldable coated steel are the properties of the plating deposit and the properties of the coating material applied thereon. As far as corrosion resistance is concerned, weldable coated steel made by coating plated steel with a coating material containing a conductive powder is far superior to simply plated steel, and in view of this, it can be easily assumed that the coated steel performance would be greatly influenced by the properties of the coating material, especially the conductive powder contained therein.

For further research on this matter, the present inventors have made various investigations and studies on the conductive powder contained in the coating material to be applied to steel.

It is said that among the steel plates used for car bodies, those forming a pouch-like structure such as car doors are placed under the most severe corrosive environment in use. In such pouch-like structure, it is difficult to have the coating material applied sufficiently, so that in such part the steel plate could stay bared out, and further such part, because of its pouch-like configuration, tends to collect water and other corrosion-promoting factors such as snow-melting salt sprinkled on the road in the winter season.

The corrosion resistance of the weldable coated steel comprising a combination of plated steel and a coat owes greatly to the anticorrosive effect of the coat itself as mentioned above, but as for the reason why the corrosion resistance is enhanced by the coat, it is considered attributable to the barrier effect of the coat which deters the penetration of the corrosive factors such as water and Cl ions.

The present inventors considered that such barrier effect against the corrosive factors would be enhanced by increasing the cohesion between conductive powder and organic resin, which is one of the coat constituents, by changing the surface condition of the conductive powder, and this would lead to a further improvement of corrosion resistance. This idea was confirmed to be valid. Thus, the present inventors have disclosed the new fact that it is strikingly effective means for enhancing the corrosion resistance of the weldable coated steel to reduce the surface oxide film of conductive powder contained in the coating material.

Various kinds of conductive materials such as metal powder and carbides would be usable as conductive powder contained in the weldable coat to be formed on steel, but in terms of weldability, a material having a melting point close to that of steel, that is, ferrous alloy powder is preferred. For instance, zinc dust, which is a low-melting point metal, is alloyed with the copper-made electrode during welding to cause an excessive increase of melt loss of the electrode, thus spoiling the progressive spot weldability which is an important characteristic of weldable coated steel.

The term "ferrous alloy powder" is used in this specification to refer to powder of iron-based alloys with Ni, Cr, Co, Mo, Mn or other like metals, and such alloys include Ni-containing steel, Cr-containing Steel, and stainless steel such as SUS 410 L, SUS 304 L, SUS 316 L, SUS 317 L, etc. Corrosion resistance can be enhanced by reducing the thickness of oxide film of such ferrous alloy powder to the level of 1.0% by weight or less in terms of oxygen concentration. Such powder can be obtained by atomizing the molten metal in an atmosphere adjusted to a desired oxygen concentration with nitrogen or other proper element by shutting off outer air. The hardness of the powder is preferably in the range of 80 to 200 in Vickers hardness in view of flow rate of steel to the mold in the press work and wear of the mold mentioned before. When ferrous alloy powder is produced by the ordinary atomization method, the Vickers hardness of the produced alloy exceeds 200, so (1) the produced alloy powder is softened by a heat treatment to have a Vickers hardness of from 80 to 200, (2) the alloy composition is properly adjusted beforehand, or both the means (1) and (2) above are combined, to obtain alloy powder having a Vickers hardness falling in the range of 80 to 200.

As the conductive powder mixed in the coating material, use of ferrous alloy powder alone is preferred from the viewpoint of weldability as stated above. In use for automobiles, steel plate is worked into a variety of sizes and shapes, and when it is used at a part of the automobiles which is subjected to a strong frictional force, such as the part which passes through draw-bead, the conductive powder in the coat is squashed and exposed directly on the coat surface. At such a part, it is preferred to replace a part of conductive powder with zinc dust rather than using ferrous alloy powder alone as the conductive powder in the coat for providing higher corrosion resistance. In this case, zinc dust is preferably mixed in a ratio of 0.2 to 3.0 to ferrous alloy powder in view of press workability and corrosion resistance of the worked part. It is also possible to add a small quantity of powder of aluminum, carbon, titanium, magnesium or the like as third component for the purpose of coloration, further improvement of corrosion resistance, etc.

In the present invention, various types of zinc or zinc base plating, for example zinc base alloy plating such as Zn-Ni or Zn-Fe alloy plating, zinc base composite plating such as Zn-Al composite plating, zinc base multilayer plating and combination thereof, may be employed as sacrificial anticorrosive plating for the base steel, but among them, Zn-Ni alloy plating is considered as the best in terms of corrosion resistance, especially resistance to red rust. In applying such Zn-Ni alloy plating, it is possible to add a third or fourth component to the alloy for improving coating coherence and corrosion resistance, or for other purposes. As such third or fourth component, metals such as Co, Cr, Fe, Sn, etc., and nonmetals such as $SiO_2$, $Al_2O_3$, $TiO_2$, $NbO_2$, $V_2O_5$, $ZrO_2$, $Ta_2O_5$, etc., can be used. The build-up of such plating is not critical in this invention, but it is preferably not less than 1 $g/m^2$ in consideration of corrosion resistance. However, a deposit in excess of 60 $g/m^2$ is practically unnecessary. The preferred range of build-up is 5 to 30 $g/m^2$.

For providing a good coherence between the plated steel and the coat, it is necessary to apply a pre-treatment such as chromate treatment to form an undercoat. Such chromate treatment can be performed by either coating or electrolytic method. The Cr content of the chromate film is preferably 1 to 200 $mg/m^2$ in case of using chromic acid alone, but is is preferably about 200 to 500 $mg/m^2$ in case of using a mixture of chromic acid and a conductive powder such as metal powder.

The coating material to be applied on the plated steel is a mixture of said ferrous alloy powder with an oxygen concentration of 1.0% by weight or less and zinc dust. The content of conductive powder mixed therewith is not specifically defined by this invention; it is decided mainly in consideration of weldability and workability. Practically, however, the total content of conductive powder is preferably about 60 to 80% by weight based on the overall nonvolatile content of the coating material. The coating vehicle is also not specified in this invention. It is possible to use, for example, synthetic resins such as epoxy, acryl, urethane, polyester, alkid, butadiene, vinyl, phthalic acid, etc., other natural resins, oil vehicles and their modified resins The coating thickness is usually about 3 to 20 $\mu m$.

In case of coating a steel plate with the coating material by using a roll coater, if the conductive powder particles are coarse, it becomes increasingly difficult for the conductive powder to get into the coating film as the film thickness becomes smaller as shown in FIG. 1. This leads to a corresponding reduction of weldability and corrosion resistance. The present inventors examined the relationship between the particle diameter of conductive powder and coating thickness and the transfer rate of conductive powder from the coating material into the coat, and found that in order to ensure 100% transfer rate, the particle diameter of conductive powder needs to satisfy the following formula:

$$\frac{\text{maximum particle diameter } (\mu m)}{\text{coating thickness } (\mu m)} < 1$$

The transfer rate is given as follows:

$$\text{Transfer rate} = \frac{\text{conductive powder content in coat}}{\text{conductive powder content coating material}} \times 100$$

The specific gravity of both of ferrous alloy powder and zinc dust should be about 7. If their particle size is large, they will settle down in the coating material. The conductive powder should be fine for this reason, too. Since the lower limit of the coating thickness is about 30 μm, practically the average particle diameter of conductive powder should be around 15 μm, the maximum particle diameter being preferably not greater than 30 μm.

EXAMPLES

The practical effect in the embodiments of this invention is shown in Tables 1–5. In the shown embodiments, a pre-colored epoxy varnish made by Nippon Yushi K.K. was used as the coating resin, and it was baked at 250° C. for 60 seconds. The coated steel plate was subjected to the following tests for evaluating coherence, press moldability, mold wearability, corrosion resistance and weldability.

(1) Cohesion test

The coated steel plate was bent to 0 T or 2 T, and a cellophane adhesive tape was stuck fast to the coat and then peeled off. The remaining amount of the coat was measured to evaluate coherence.

(2) Press moldability test

By using a 250 T press, a ½ scale model of an actual car door was molded and the drawability of steel into the press mold and press cracking of steel plate were examined.

(3) Mold wearability test 100 pieces of 50 mm-diameter cylindrical cup were molded continuously, and then the degree of wear and flaw of the press mold was determined.

(4) Corrosion resistance test

The flawless portion of flat plate, the cross-cut portion of flat plate and the portion drawn through bead were subjected to salt spray test and the degree of rusting was measured.

(5) Weldability test

Spot welding was conducted by using 6 mm-diameter electrodes under the conditions of pressing force of 200 kgs, weld time of 10 cycles and welding current of 8,500 A, and the number of the parts that could be spot welded progressively was examined.

The oxygen concentration of ferrous alloy powder was measured according to JIS Z-2613. The powder hardness was determined by using a micro-Vickers hardness tester under a load of 25 g. As seen in Table 5, in case zinc dust alone is used as conductive powder (Comparative Example 6), the flow rate of steel into the mold is high (poor press moldability) and white rust tends to develop at the portion drawn through bead. The continuous spot weldability is also unsatisfactory.

In case of using mixed conductive powder with an oxygen concentration in ferrous alloy powder of higher than 1.0% by weight and a Vickers hardness above 200 (Comparative Example 4), although weldability of the coat is improved, white rust tends to develop. Also, because of high powder hardness, the probability of causing press cracking is high and the mold wearability is also bad. Corrosion resistance is greatly improved by reducing the oxygen concentration of the powder below 1.0% by weight, but press moldability and mold wearability are not improved (Comparative Example 5).

In case the hardness of ferrous alloy powder alone is made lower than 200 in Vickers hardness (Comparative Example 1), press moldability and mold wearability alone are improved. From these results, it can be learned that the corrosion resistance is influenced by the oxygen concentration of ferrous alloy powder while the press moldability and mold wearability are influenced by the hardness of ferrous alloy powder.

According to Examples 1–20 of this invention using a mixture of ferrous alloy powder having an average particle diameter below 15 μm, the maximum particle diameter below 30 μm, an oxygen concentration of less than 1.0% by weight and a Vickers hardness of from 80 to 200 and zinc dust, the corrosion resistance is greatly improved and the press moldability and mold wearability are also improved. However, when the mixing ratio of zinc dust to ferrous alloy powder exceeds 3.0 (Comparative Example 2), the draw-in length increases, and when the mixing ratio becomes lower than 0.2 (Comparative Example 3), the corrosion resistance at the portion drawn through bead is worsened.

In case of using ferrous alloy powder having an average particle diameter of 30 μm in which 50% of the powder had a particle diameter of 30 μm, the content of ferrous alloy, which was 30% in the coating material, was reduced to 15% in the coat and the weldability was deteriorated (Comparative Example 7).

As is apparent from the foregoing description, the weldable coated steel according to this invention has excellent corrosion resistance, press workability, mold wearability and weldability, so that it can be advantageously applied as anticorrosive steel for automobiles which is subject to high-precision working and used under severe corrosive environments.

TABLE 1

|  | Example 1 | Example 2 | Example 3 | Example 4 | Example 5 |
| --- | --- | --- | --- | --- | --- |
| Plating composition (wt %) (remainder: Zn) | Ni (8) | Ni (13) | Ni (10) | Ni (10) Co (0.3) | Ni (8) Fe (5) Cr (0.1) |
| Build-up (g/m²) | 20 | 20 | 20 | 20 | 20 |
| Chromate (mg/m²) | Electrolytic chromate 30 | Electrolytic chromate 30 | Electrolytic chromate 30 | Electrolytic chromate 30 | Electrolytic chromate 30 |
| Coating thickness (μm) | 5 | 5 | 5 | 5 | 5 |
| Content in coat (%) |  |  |  |  |  |
| Zinc dust Kind of | 40 | 40 | 30 | 40 | 40 |

TABLE 1-continued

|  |  |  | Example 1 | Example 2 | Example 3 | Example 4 | Example 5 |
|---|---|---|---|---|---|---|---|
| ferrous alloy | Hardness | Oxygen conc. | | | | | |
| SUS410 | 250 | 3.3% | | | | | |
| SCA52 | 230 | 0.5% | | | | | |
| SUS410L | 180 | 2.1% | | | | | |
| SUS410L | 180 | 0.6% | | | 25 | 30 | |
| SUS304L | 130 | 0.2% | 30 | 30 | 20 | | 30 |
| Adherence | | | | | | | |
| 0T | | | ⊚∼○ | ⊚∼○ | ⊚∼○ | ⊚∼○ | ⊚∼○ |
| 2T | | | ⊚ | ⊚ | ⊚ | ⊚ | ⊚ |
| Press moldability | | | ⊚ | ⊚ | ⊚ | ⊚ | ⊚ |
| Mold wearability | | | ⊚ | ⊚ | ⊚ | ⊚ | ⊚ |
| Corrosion resistance | | | | | | | |
| Flawless portion of flat plate (3000 hrs) | | | ⊚ | ⊚ | ⊚ | ⊚ | ⊚ |
| Cross-cut portion of flat plate (3000 hrs) | | | ⊚ | ⊚ | ⊚ | ⊚ | ⊚ |
| Portion drawn through bead (1000 hrs) | | | ⊚ | ⊚ | ⊚ | ⊚ | ⊚ |
| Weldability | | | >5000 | >5000 | >5000 | >5000 | >5000 |

TABLE 2

|  |  |  | Example 6 | Example 7 | Example 8 | Example 9 | Example 10 |
|---|---|---|---|---|---|---|---|
| Plating composition (wt %) (remainder: Zn) | | | Ni (8) Fe (2) Cr (0.3) | Ni (8) Sn (5) | Ni (10) SiO$_2$ (3) | Ni (10) Al$_2$O$_3$ (3) | Ni (10) TiO$_2$ (3) |
| Build-up (g/m$^2$) | | | 20 | 20 | 20 | 20 | 20 |
| Chromate (mg/m$^2$) | | | Electrolytic chromate 30 | Electrolytic chromate 30 | Electrolytic chromate 30 | Electrolytic chromate 30 | Electrolytic chromate 30 |
| Coating thickness (μm) | | | 5 | 5 | 5 | 5 | 5 |
| Content in coat (%) | | | | | | | |
| Zinc dust | | | 25 | 40 | 20 | 50 | 40 |
| Kind of ferrous alloy | Hardness | Oxygen conc. | | | | | |
| SUS410 | 250 | 3.3% | | | | | |
| SCA52 | 230 | 0.5% | | | | | |
| SUS410L | 180 | 2.1% | | | | | |
| SUS410L | 180 | 0.6% | | | 50 | 25 | |
| SUS304L | 130 | 0.2% | 50 | 30 | | | 30 |
| Adherence | | | | | | | |
| 0T | | | ⊚∼○ | ⊚∼○ | ⊚∼○ | ⊚∼○ | ⊚∼○ |
| 2T | | | ⊚ | ⊚ | ⊚ | ⊚ | ⊚ |
| Press moldability | | | ⊚ | ⊚ | ⊚ | ⊚ | ⊚ |
| Mold wearability | | | ⊚ | ⊚ | ⊚ | ⊚ | ⊚ |
| Corrosion resistance | | | | | | | |
| Flawless portion of flat plate (3000 hrs) | | | ⊚ | ⊚ | ⊚ | ⊚ | ⊚ |
| Cross-cut portion of flat plate (3000 hrs) | | | ⊚ | ⊚ | ⊚ | ⊚ | ⊚ |
| Portion drawn through bead (1000 hrs) | | | ⊚ | ⊚ | ⊚ | ⊚ | ⊚ |
| Weldability | | | >5000 | >5000 | >5000 | >5000 | >5000 |

TABLE 3

|  |  |  | Example 11 | Example 12 | Example 13 | Example 14 | Example 15 |
|---|---|---|---|---|---|---|---|
| Plating composition (wt %) (remainder: Zn) | | | Ni (10) V$_2$O$_6$ (3) | Ni (10) ZrO$_2$ (3) | Ni (10) Ta$_2$O$_5$ (3) | Ni (10) | Ni (10) |
| Build-up (g/m$^2$) | | | 20 | 20 | 20 | 5 | 30 |
| Chromate (mg/m$^2$) | | | Electrolytic chromate 30 | Electrolytic chromate 30 | Electrolytic chromate 30 | Electrolytic chromate 30 | Electrolytic chromate 30 |
| Coating thickness (μm) | | | 5 | 5 | 5 | 5 | 5 |
| Content in coat (%) | | | | | | | |
| Zinc dust | | | 30 | 45 | 35 | 20 | 45 |
| Kind of ferrous alloy | Hardness | Oxygen conc. | | | | | |
| SUS410 | 250 | 3.3% | | | | | |
| SCA52 | 230 | 0.5% | | | | | |
| SUS410L | 180 | 2.1% | | | | | |

TABLE 3-continued

|  |  |  | Example 11 | Example 12 | Example 13 | Example 14 | Example 15 |
|---|---|---|---|---|---|---|---|
| SUS410L | 180 | 0.6% | 40 |  | 25 | 20 |  |
| SUS304L | 130 | 0.2% |  | 30 | 15 | 30 | 30 |
| Adherence |  |  |  |  |  |  |  |
| 0T |  |  | ⊚~○ | ⊚~○ | ⊚~○ | ⊚~○ | ⊚~○ |
| 2T |  |  |  |  |  | ⊚ | ⊚ |
| Press moldability |  |  | ⊚ | ⊚ | ⊚ | ⊚ | ⊚ |
| Mold wearability |  |  | ⊚ | ⊚ | ⊚ | ⊚ | ⊚ |
| Corrosion resistance |  |  |  |  |  |  |  |
| Flawless portion of flat plate (3000 hrs) |  |  | ⊚ | ⊚ | ⊚ | ⊚ | ⊚ |
| Cross-out portion of flat plate (3000 hrs) |  |  | ⊚ | ⊚ | ⊚ | ⊚~○ | ⊚ |
| Portion drawn through bead (1000 hrs) |  |  | ⊚ | ⊚ | ⊚ | ⊚ | ⊚ |
| Weldability |  |  | >5000 | >5000 | >5000 | >5000 | >5000 |

TABLE 4

|  |  |  |  | Example 16 | Example 17 | Example 18 | Example 19 | Example 20 |
|---|---|---|---|---|---|---|---|---|
| Plating composition (wt %) (remainder: Zn) |  |  |  | Ni (10) | Ni (10) | Ni (10) | Ni (10) | Fe (20) |
| Build-up (g/m²) |  |  |  | 20 | 20 | 20 | 20 | 20 |
| Chromate (mg/m²) |  |  |  | Electrolytic chromate 30 | Electrolytic chromate 30 | Dacronet 300 | Electrolytic chromate 30 | Electrolytic chromate 30 |
| Coating thickness (μm) |  |  |  | 3 | 10 | 5 | 5 | 5 |
| Content in coat (%) | Zinc dust |  |  | 40 | 30 | 35 | 35 | 40 |
|  | Kind of ferrous alloy | Hardness | Oxygen conc. |  |  |  |  |  |
|  | SUS410 | 250 | 3.3% |  |  |  |  |  |
|  | SCA52 | 230 | 0.5% |  |  |  |  |  |
|  | SUS410L | 180 | 2.1% |  |  |  |  |  |
|  | SUS410L | 180 | 0.6% | 35 |  | 40 | 40 |  |
|  | SUS304L | 130 | 0.2% |  | 40 |  |  | 30 |
| Adherence | 0T |  |  | ⊚~o | ⊚~o | o | ⊚~o | ⊚~o |
|  | 2T |  |  | ⊚ | ⊚ | ⊚~o | ⊚ | ⊚ |
| Press moldability |  |  |  | ⊚ | ⊚ | ⊚ | ⊚ | ⊚ |
| Mold wearability |  |  |  | ⊚ | ⊚ | ⊚ | ⊚ | ⊚ |
| Corrosion resistance | Flawless portion of flat plate (3000 hrs) |  |  | ⊚~o | ⊚ | ⊚ | (Blister) Δ | (Red rust) Δ |
|  | Cross-cut portion of flat plate (3000 hrs) |  |  | ⊚~o ⊚ | ⊚ ⊚ | ⊚ ⊚ | (Blister) x | (Red rust) o |
|  | Portion drawn through bead (1000 hrs) |  |  | o | ⊚ | ⊚ | (Blister) Δ | (Red rust) o |
| Weldability |  |  |  | >5000 | 4000 | >5000 | 5000 | >5000 |

TABLE 5

|  |  |  |  | Comp. Example 1 | Comp. Example 2 | Comp. Example 3 | Comp. Example 4 | Comp. Example 5 | Comp. Example 6 | Comp. Example 7 |
|---|---|---|---|---|---|---|---|---|---|---|
| Plating composition (wt %) (remainder: Zn) |  |  |  | Ni (10) | Ni (10) | Ni (10) | Ni (10) | Ni (10) | Ni (10) | Ni (10) |
| Build-up (g/m²) |  |  |  | 20 | 20 | 20 | 20 | 20 | 20 | 20 |
| Chromate (mg/m²) |  |  |  | Electrolytic chromate 30 | Electrolytic chromate 30 | Electrolytic chromate 30 | Electrolytic chromate 30 | Electrolytic chromate 30 | Electrolytic chromate 30 | Electrolytic chromate 30 |
| Coating thickness (μm) |  |  |  | 5 | 5 | 5 | 5 | 5 | 5 | 5 |
| Content in coat (%) | Zinc dust |  |  | 30 | 60 | 10 | 30 | 30 | 75 | 30 |
|  | Kind of ferrous alloy | Hardness | Oxygen conc. |  |  |  |  |  |  |  |
|  | SUS410 | 250 | 3.3% |  |  |  |  | 40 | 40 |  |
|  | SCA52 | 230 | 0.5% |  |  |  |  |  |  |  |
|  | SUS410L | 180 | 2.1% | 40 |  |  |  |  |  |  |
|  | SUS410L | 180 | 0.6% |  | 15 |  |  |  |  | 15 |
|  | SUS304L | 130 | 0.2% |  |  |  | 60 |  |  |  |
| Adherence | 0T |  |  | o | ⊚~o | ⊚~o | o | ⊚~o | o | ⊚~o |
|  | 2T |  |  | ⊚~o | ⊚ | ⊚ | ⊚~o | ⊚ | ⊚~o | ⊚ |
| Press moldability |  |  |  | ⊚ | (Drawing) Δ ⊚ | ⊚ ⊚ | (Press cracking) Δ | (Press cracking) Δ | (Drawing) x | ⊚ ⊚ |
| Mold wearability |  |  |  | ⊚ | ⊚ | ⊚ | Δ | Δ | ⊚ | ⊚ |
| Corrosion resistance | Flawless portion of flat plate (3000 hrs) |  |  | (White rust) | ⊚ | ⊚ | (White rust) |  | ⊚~o | ⊚~o |

TABLE 5-continued

| | | | | | | | | |
|---|---|---|---|---|---|---|---|---|
| resistance | Cross-cut portion of flat plate (3000 hrs) | ⊚~Δ (White rust) Δ~x | (White rust) ⊚~o | | ⊚~Δ (White rust) x | ⊚ | (White rust) o | o |
| | Portion drawn through bead (1000 hrs) | (White rust) Δ | (White rust) o | (Red rust) x | (White rust) Δ | ⊚ | (White rust) o | o |
| Weldability | | >5000 | 5000 | >5000 | >5000 | >5000 | 3000 | 2000 |

In the tables above, the rating criteria are as follows:

(1) Cohesion test
⊚ - not peeled
⊚~o - peeled area of 1% or less
o - peeled area of 5% or less
Δ - peeled area of 25% or less
x - peeled area of 50% or more

(2) Press moldability test
⊚ - same as state of cold rolled steel plate
Δ(drawing) - 5 mm or more greater draw-in length than that of cold rolled steel plate
x (drawing) - 10 mm or more greater draw-in length than that of cold rolled steel plate
Δ(press cracking) - cracked when press molded

(3) Mold wearability test
⊚ - scratching degree of mold: superior to that of cold rolled steel plate
o - scratching degree of mold: equal to that of cold rolled steel plate
Δ - scratching degree of mold: inferior to that of cold rolled steel plate (small amount of scratches observed on the mold)
x - scratching degree of mold: highly scratched

(4) Corrosion resistance test
⊚ - no rust and no blister
⊚~o - area of rust or blister: 1% or less
o - area of rust or blister: 5% or less
o~Δ - area of rust or blister: 10% or less
Δ - area of rust or blister: 25% or less
Δ~x - area of rust or blister: 50% or less
x - area of rust or blister: 75% or more.

What is claimed is:

1. A weldable coated steel plate having excellent corrosion resistance, which plate has a plating of zinc, a zinc base alloy or a zinc composite and a coating material provided on said plating, comprising a mixture of at least one type of ferrous alloy powder with an oxygen concentration of 1.0% by weight or less and zinc dust.

2. The weldable coated steel plate according to claim 1, wherein the ferrous alloy powder has a Vickers hardness in the range of from 80 to 200.

3. The weldable coated steel plate according to claim 1, wherein the mixing ratio of the zinc dust to the ferrous alloy powder in the coating material is in the range of 0.2-3.0 to 1.

4. The weldable coated steel plate according to claim 1, wherein the particle diameter of the ferrous alloy powder in the coating material is in the range of 30 μm or less.

5. The weldable coated steel plate according to claim 1, wherein the content of the ferrous alloy powder in the coating material is in the range of 60-80% by weight based on the non-volatile matter.

6. The weldable coated steel plate according to claim 1, wherein the ferrous alloy powder is a powder of stainless steel such as SUS 410-L and SUS 304-L.

7. The weldable coated steel plate according to claim 1, wherein, the thickness of the baked coating on the steel plate is in the range of 3-20 μm.

8. The weldable coated steel plate according to claim 1, wherein the build-up of plating with zinc or a zinc base alloy or composite plating is in the range of 5-30 g/m$^2$.

* * * * *